(12) United States Patent
Carlioz et al.

(10) Patent No.: US 11,136,126 B2
(45) Date of Patent: Oct. 5, 2021

(54) PLATFORM FIRST CLASS

(71) Applicant: Safran Seats GB Limited, Cwmbran (GB)

(72) Inventors: Victor Carlioz, Newport Beach, CA (US); James B. Woodington, Cwmbran (GB); Rachel West, Pontypool (GB); Jan Jurre Miedema, Cardiff (GB)

(73) Assignee: Safran Seats GB Limited, Cwmbran (GB)

( * ) Notice: Subject to any disclaimer, the term of this patent is extended or adjusted under 35 U.S.C. 154(b) by 316 days.

(21) Appl. No.: 15/939,810

(22) Filed: Mar. 29, 2018

(65) Prior Publication Data

US 2018/0281964 A1  Oct. 4, 2018

Related U.S. Application Data

(60) Provisional application No. 62/478,299, filed on Mar. 29, 2017.

(51) Int. Cl.
*B64D 11/06*  (2006.01)

(52) U.S. Cl.
CPC ...... *B64D 11/0606* (2014.12); *B64D 11/0601* (2014.12); *B64D 11/0604* (2014.12); *B64D 11/0641* (2014.12)

(58) Field of Classification Search
CPC .......... B64D 11/0601; B64D 11/0604; B64D 11/0606; B64D 11/0641
See application file for complete search history.

(56) References Cited

U.S. PATENT DOCUMENTS

| | | | |
|---|---|---|---|
| 2012/0223557 A1* | 9/2012 | Henshaw | B64D 11/0641 297/232 |
| 2016/0059966 A1* | 3/2016 | Dryburgh | B64D 11/00 244/118.6 |
| 2016/0297531 A1* | 10/2016 | Simeon | B64D 11/0602 |
| 2017/0129611 A1* | 5/2017 | Morgan | B64D 11/0601 |
| 2018/0105273 A1* | 4/2018 | Robinson | B64D 11/0605 |
| 2020/0062403 A1* | 2/2020 | Williams | B64D 11/0605 |

* cited by examiner

*Primary Examiner* — Philip J Bonzell
*Assistant Examiner* — Tye William Abell
(74) *Attorney, Agent, or Firm* — Kilpatrick Townsend & Stockton LLP

(57) ABSTRACT

Described are examples of a seating arrangement for an aircraft with a first seat in a first accommodation space and a second seat in a second accommodation space, wherein the first and second accommodation spaces are configured to share a common floor space at a floor level of the aircraft. One seating arrangement includes a divider screen located between the first and second accommodation spaces, moveable, by sliding in a direction along the common floor space, between a stowed position permitting passenger egress between the first and second accommodation spaces across the common floor space, and a deployed position preventing passenger egress between the first and second accommodation spaces across the common floor space.

26 Claims, 18 Drawing Sheets

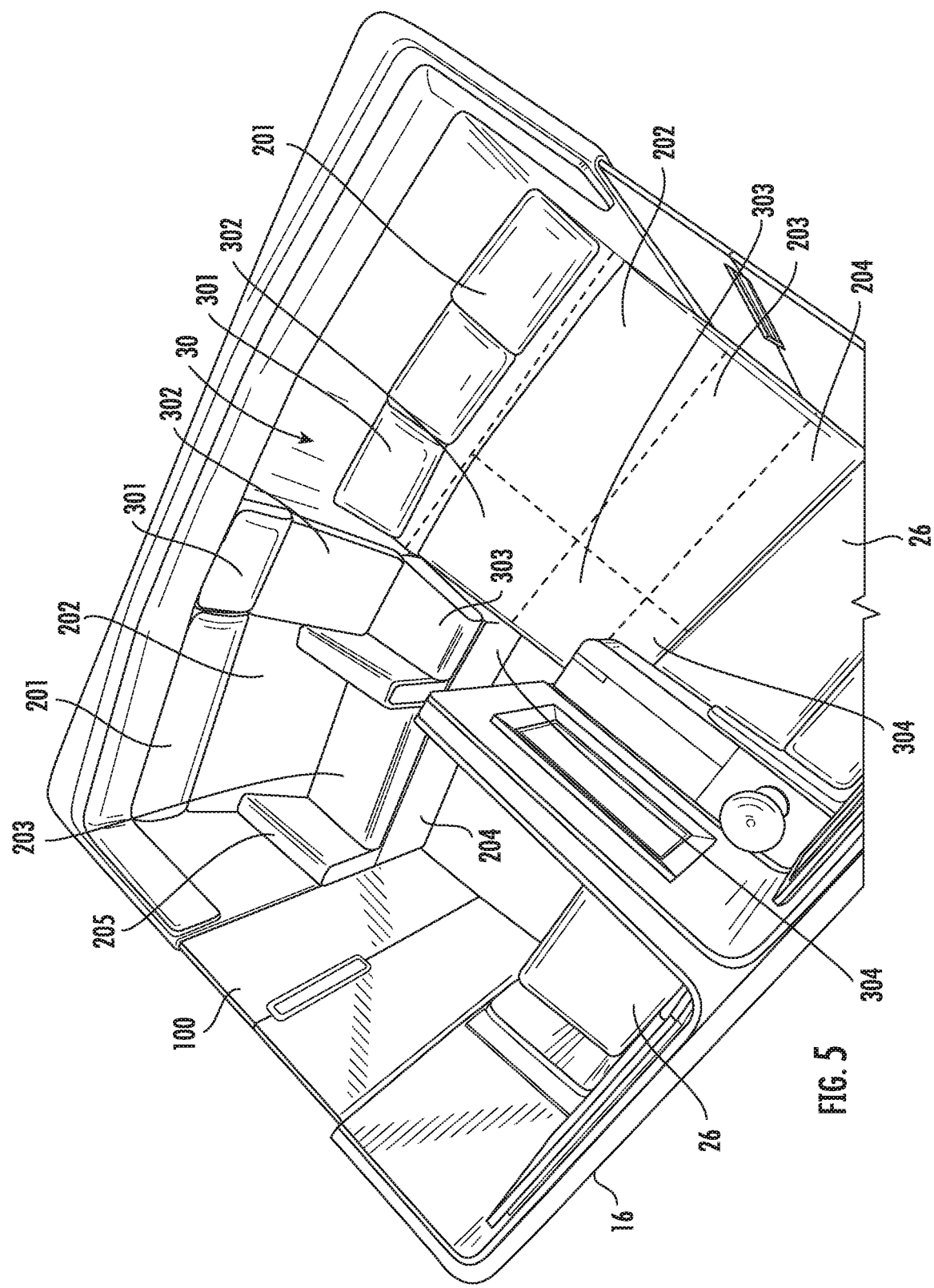

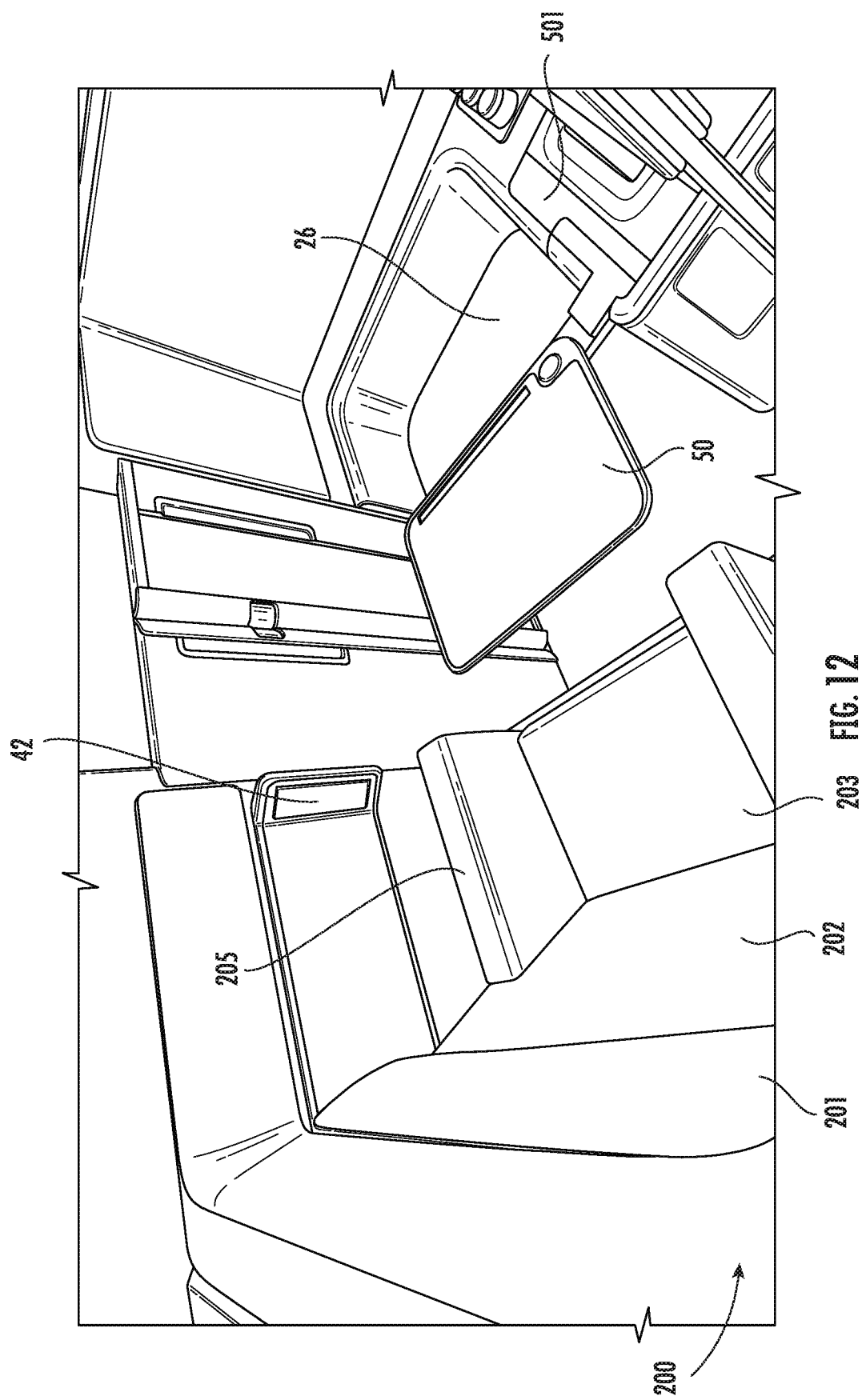

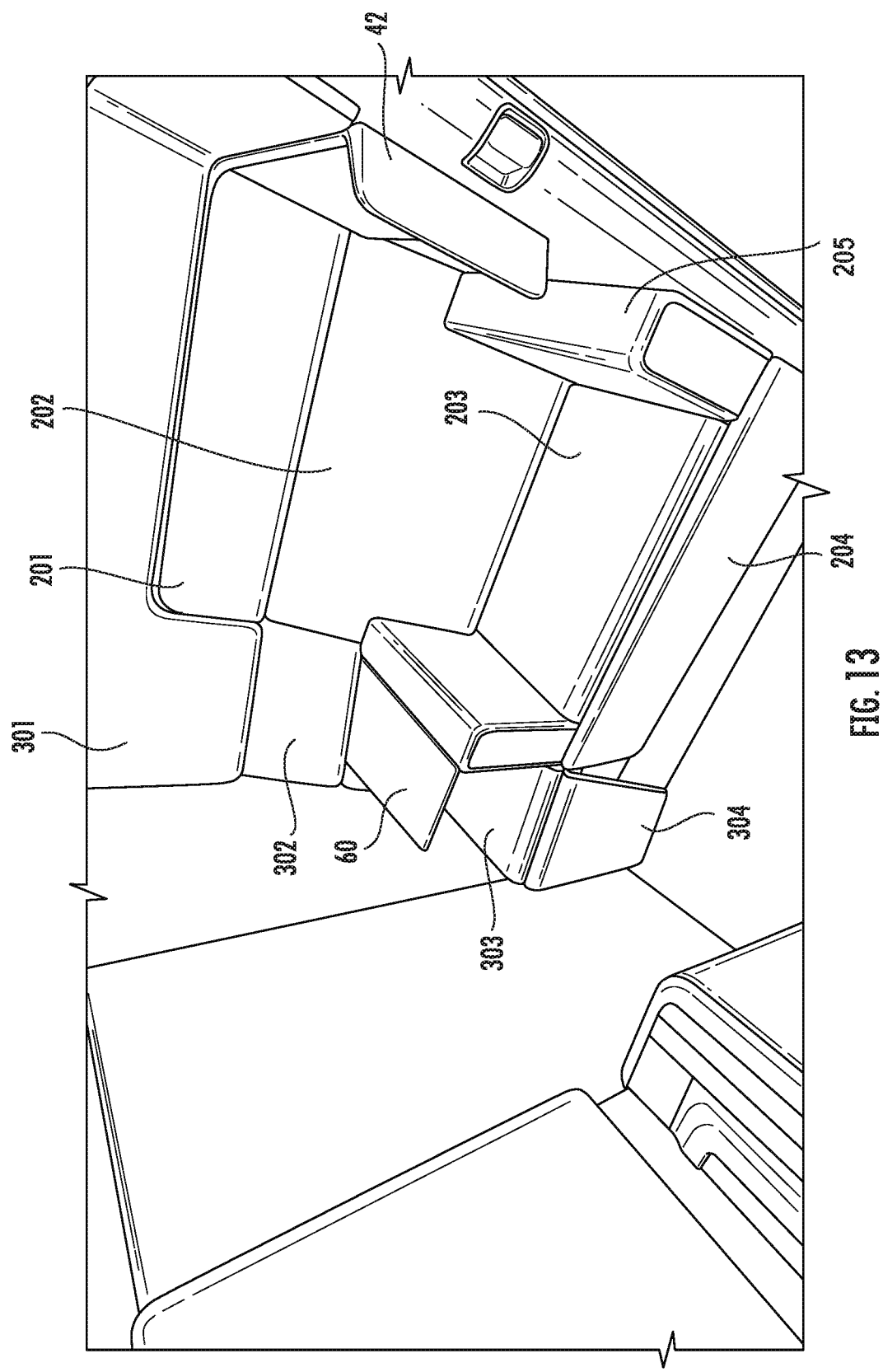

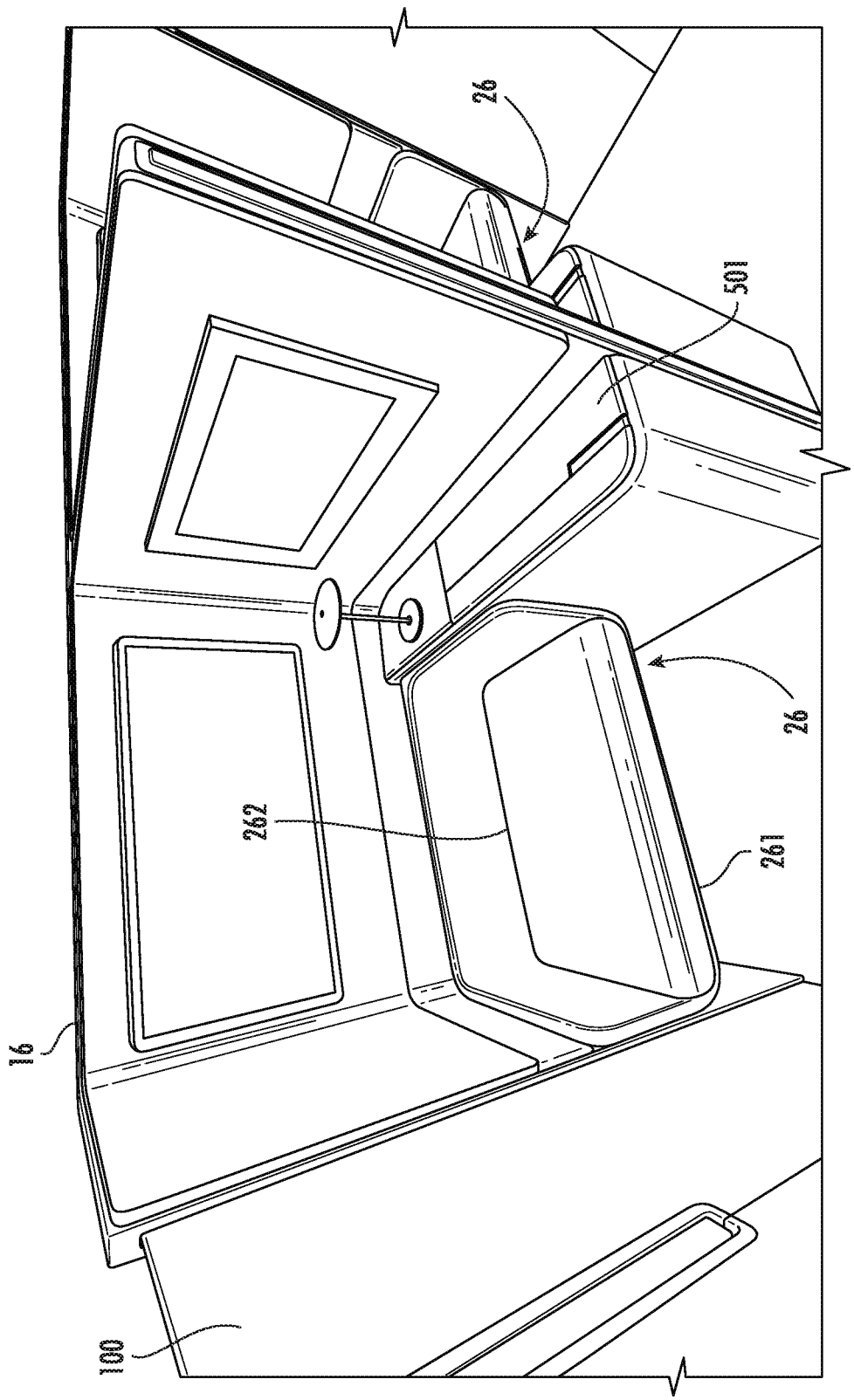

PLATFORM FIRST CLASS

CROSS REFERENCE TO RELATED APPLICATIONS

This application is related to and claims priority benefits from U.S. Provisional Application Ser. No. 62/478,299 ("the '299 application"), filed Mar. 29, 2017, entitled PLATFORM FIRST CLASS. The '299 application is hereby incorporated in its entirety by this reference.

FIELD OF THE INVENTION

The field of invention relates to an arrangement of seat units for vehicle cabins.

BACKGROUND

As is well-known, business and first class aircraft seats offer passengers different comfort positions, from the seat position to a bed position that is substantially horizontal in flight.

Most first class seating arrangements provide seating units that offer some level of privacy to a passenger therein, but the first class cabin nevertheless retains the feel of an aircraft, albeit with more room and conveniences than lower class cabins. Many first class cabins provide suites for passengers to provide additional comfort and privacy. In certain cabins, these suites can be shared to create passenger interaction. These shared suites are generally configured by means of a central dividers that move down to the console level, or slide in forward and backward on the top of the console, to enable passengers to talk to each other. In this configuration, the suite is limited in size, and the placement and position of the divider is dependent upon the console between passenger seats.

Thus, it may be desirable to create an improved first class cabin providing a unique suite layout efficiently utilizing the cabin space, thereby providing a suite with a larger seating area. It may also be desirable to provide a suite with a divider screen configured to transform the suite from two separate suites into one large shared suite.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seating arrangement for an aircraft comprises a first seat in a first accommodation space and a second seat in a second accommodation space, wherein the first accommodation space and the second accommodation space are configured to share a common floor space at a floor level of the aircraft. The seating arrangement further comprises a divider screen located between the first accommodation space and the second accommodation space, moveable, by sliding in a direction along the common floor space, between a stowed position permitting passenger egress between the first accommodation space and the second accommodation space across the common floor space, and a deployed position preventing passenger egress between the first accommodation space and the second accommodation space across the common floor space, and extending from substantially the floor level of the aircraft to a height of at least approximately one meter above the floor level of the aircraft.

According to some embodiments, in the stowed position, the divider screen is located in a gap between the first seat and the second seat. The divider screen may further extend from substantially floor level to a height of at least approximately 1.25 meters, 1.5 meters, or 2 meters or more above the floor level.

In some embodiments, the first accommodation space and the second accommodation space define a first space axis and a second space axis, respectively, and wherein the first space axis and the second space axis are substantially parallel. A sliding direction of the divider screen may be substantially parallel to the first space axis and the second space axis. In some embodiments, the sliding movement of the divider screen comprises a telescopic action. The sliding movement of the divider screen can be manually or electrically operated.

In some embodiments, the first seat and the second seat define a first seat axis and a second seat axis, respectively, and wherein the first seat axis and the second seat axis are substantially parallel. The first seat and the second seat may face substantially the same direction.

According to some embodiments, the first seat and the second seat are convertible to a first bed surface and a second bed surface, respectively, and wherein the arrangement further comprises an inflatable member provided in a gap between the first seat and the second seat so that, in an inflated state, the inflatable member provides a bed surface to co-operate with the first bed surface and the second bed surface.

In some embodiments, the first accommodation space and the second accommodation space are defined by aircraft module walls and the divider screen.

According to certain embodiments of the present invention, a seating arrangement for an aircraft comprises a first seat in a first accommodation space and a second seat in a second accommodation space, wherein the first accommodation space and the second accommodation space are configured to share a common floor space at a floor level of the aircraft, and wherein the first seat and the second seat are convertible to a first bed and a second bed. The seating arrangement further comprises an inflatable member provided in a gap between the first seat and the second seat so that, in an inflated state, the inflatable member provides a bed surface to co-operate with bed surfaces of the first bed and the second bed.

In some embodiments, the first bed and the second bed have a first bed axis and a second bed axis, respectively, that are substantially parallel. A first bed surface and a second bed surface of the first bed and the second bed, respectively, may be at a bed height above the floor level. A third bed surface provided by the inflatable member may also be provided at bed height between the first bed surface and the second bed surface to define a shared bed surface comprising the first bed surface, the second bed surface, and the third bed surface. This configuration allows the passengers seated in the adjacent accommodation spaces to share the bed position by lying fore/aft along each of the first and second bed surfaces or by lying at 90 degrees across the first, second, and third bed surfaces.

The gap may be at bed height between the first bed surface and the second bed surface and extends between the first bed and the second bed in a direction substantially parallel to the first bed axis and the second bed axis. In certain embodiments, there is no immovable structure in the gap between the first seat and the second seat at bed height.

In some embodiments, the first seat and the second seat define a first seat axis and a second seat axis, respectively, and wherein the first seat axis and the second seat axis are substantially parallel. The first seat and the second seat may face substantially the same direction.

According to some embodiments, a divider screen is located in the gap between the first seat and the second seat, moveable between a stowed position permitting passenger egress between the first accommodation space and the second accommodation space across the common floor space, and a deployed position preventing passenger egress between the first accommodation space and the second accommodation space across the common floor space.

The divider screen may be moveable between its stowed position and its deployed position by sliding in a direction along the common floor space and extending from substantially the floor level of the aircraft to a height of at least approximately 1 meter, 1.25 meters, 1.5 meters, or 2 meters or more above the floor level of the aircraft. In some embodiments, the sliding movement of the divider screen comprises a telescopic action. The sliding movement of the divider screen can be manually or electrically operated.

In some embodiments, the first accommodation space and the second accommodation space define a first space axis and a second space axis, respectively, and wherein the first space axis and the second space axis are substantially parallel. A sliding direction of the divider screen may be substantially parallel to the first space axis and the second space axis.

In some embodiments, the first accommodation space and the second accommodation space are defined by aircraft module walls and the divider screen.

BRIEF DESCRIPTION OF THE DRAWINGS

FIG. 12 is a perspective view of one of the accommodation spaces of FIG. 1, with the tray table in a deployed position, according to certain embodiments of the present invention.

FIG. 13 is a perspective view of one of the accommodation spaces of FIG. 1, with the side table in a deployed position, according to certain embodiments of the present invention.

FIG. 14 is a perspective view of an ottoman of one of the accommodation spaces of FIG. 1, according to certain embodiments of the present invention.

FIG. 15 is a perspective view of the ottoman of FIG. 14, with the ottoman top in a deployed position.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of seat units may be described with reference to an aircraft cabin, they are by no means so limited. In fact, the seat units may be used in conjunction with any type of vehicle cabin or otherwise as desired.

According to certain embodiments of the present invention, as illustrated in FIGS. 1-18, an aircraft cabin 10 comprises an arrangement 12 formed by at least two primary accommodation spaces 14*a*. The primary accommodation spaces 14*a* may be arranged along a longitudinal axis X of the cabin and positioned adjacent one another to form a seating suite 16, which is described in more detail below. The accommodation spaces 14*a* are defined by aircraft module walls and a divider screen 24, which is also described in more detail below.

Figure 3:
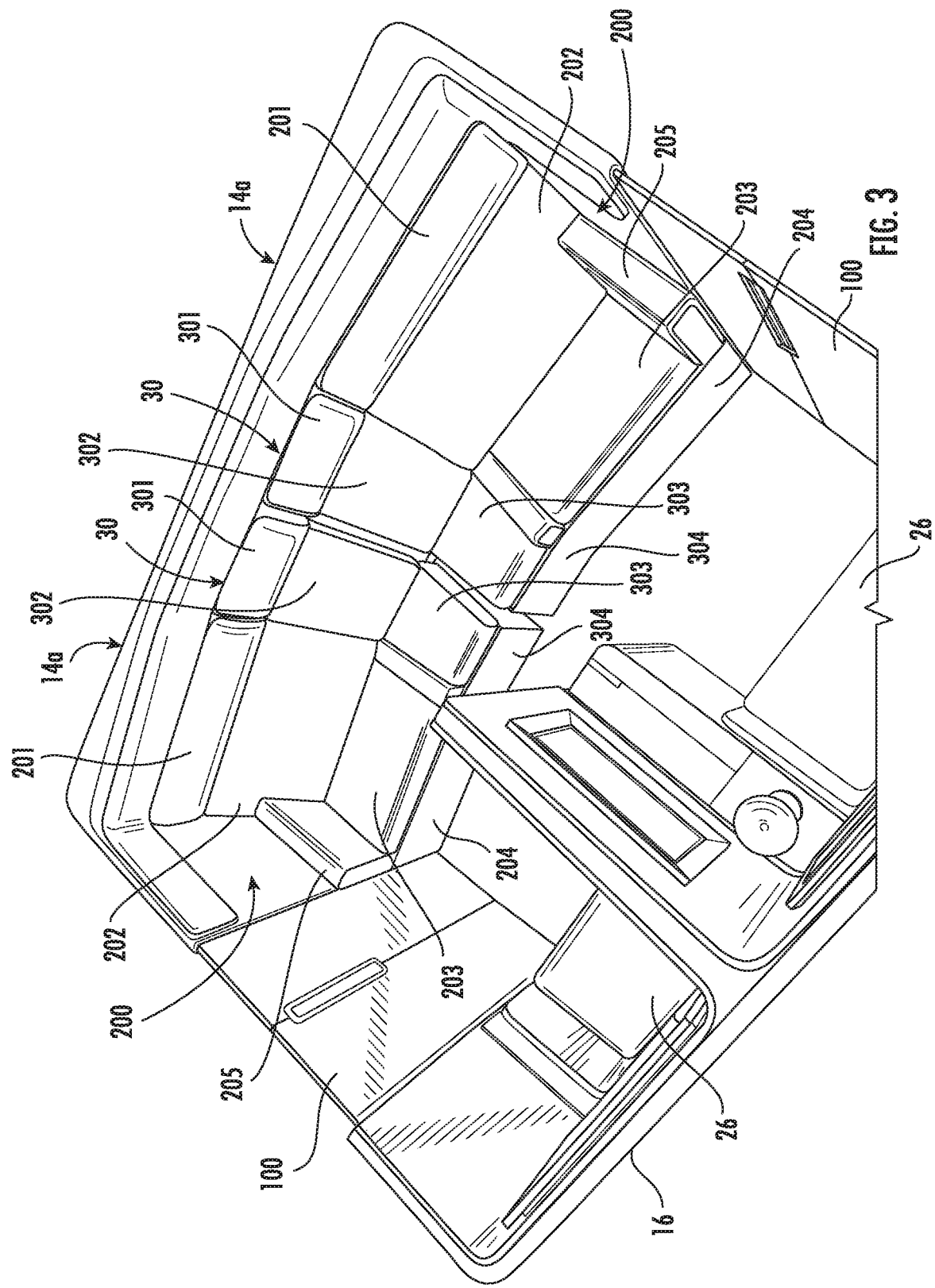
FIG. 3 is a top perspective view of the seating suite of FIG. 1, with the divider screen in a stowed position, according to certain embodiments of the present invention.

As best illustrated in FIG. 3, each accommodation space 14*a* comprises a seat 200 having a headrest 201, seat back 202, seat bottom 203, and a footrest 204. In certain embodiments, the seat 200 further comprises a drop down armrest 205 configured to move between a stowed position wherein the armrest 205 is configured to be flush with the seat bottom 203 and a deployed position wherein the armrest 205 is configured to be positioned at a raised position above the seat bottom 203. The seat 200 is configurable between an upright or TTL (taxi, takeoff and landing) position and a bed position, which is described in greater detail below. Each accommodation space 14a may further comprise a door 100 that is configured to provide access to an aisle of the aircraft cabin 10. As best illustrated in FIGS. 3 and 16-18, in some embodiments, the accommodation space 14a may further comprise an expansion wing 30, which is described in greater detail below.

According to certain embodiments, each accommodation space 14a further comprises an ottoman 26. As can be seen in FIG. 14, the ottoman comprises an interior facing edge 261 positioned facing an interior of the accommodation space 14a and an exterior facing edge 262 positioned adjacent to and facing an exterior wall of the accommodation space 14a. In certain embodiments, the interior facing edge 261 and the exterior facing edge 262 are configured to be parallel with respect to one another. In other embodiments, the ottoman 26 may be shaped such that the interior facing edge 261 and the exterior facing edge 262 are not parallel to one another. Furthermore, the ottoman 26 may be adjustable to move the ottoman 26 by any suitable means such that the interior facing edge 261 is positioned so that it is in mating contact with the seat 200 when the seat 200 is in a longitudinal bed position. For example, the ottoman 26 position may be adjusted via any suitable means including but not limited to sliding or telescoping. In any event, as illustrated in FIG. 5, the ottoman 26 is configured so that the interior facing edge 261 mates with the extended edge of the seat 200 in the longitudinal bed position to provide continuous support to a passenger in the longitudinal bed position.

In certain embodiments, the ottoman 26 further comprises an ottoman top 263 and an ottoman bottom 264. The ottoman top 263 may be connected to the ottoman bottom 264 by any suitable means such that the ottoman top 263 can be positioned in a deployed position, thereby providing access to one or more interior compartments 265 of the ottoman. As best illustrated in FIG. 15, the ottoman bottom 264 further comprises an interior compartment 265 configured to store items.

In certain embodiments, as best illustrated in FIGS. 3 and 16-18, accommodation space 14a further comprises a plurality of expansion wings 30 positioned adjacent the seat 200. The expansion wing 30 is configured to provide additional support surfaces/space for a passenger.

Figure 4:
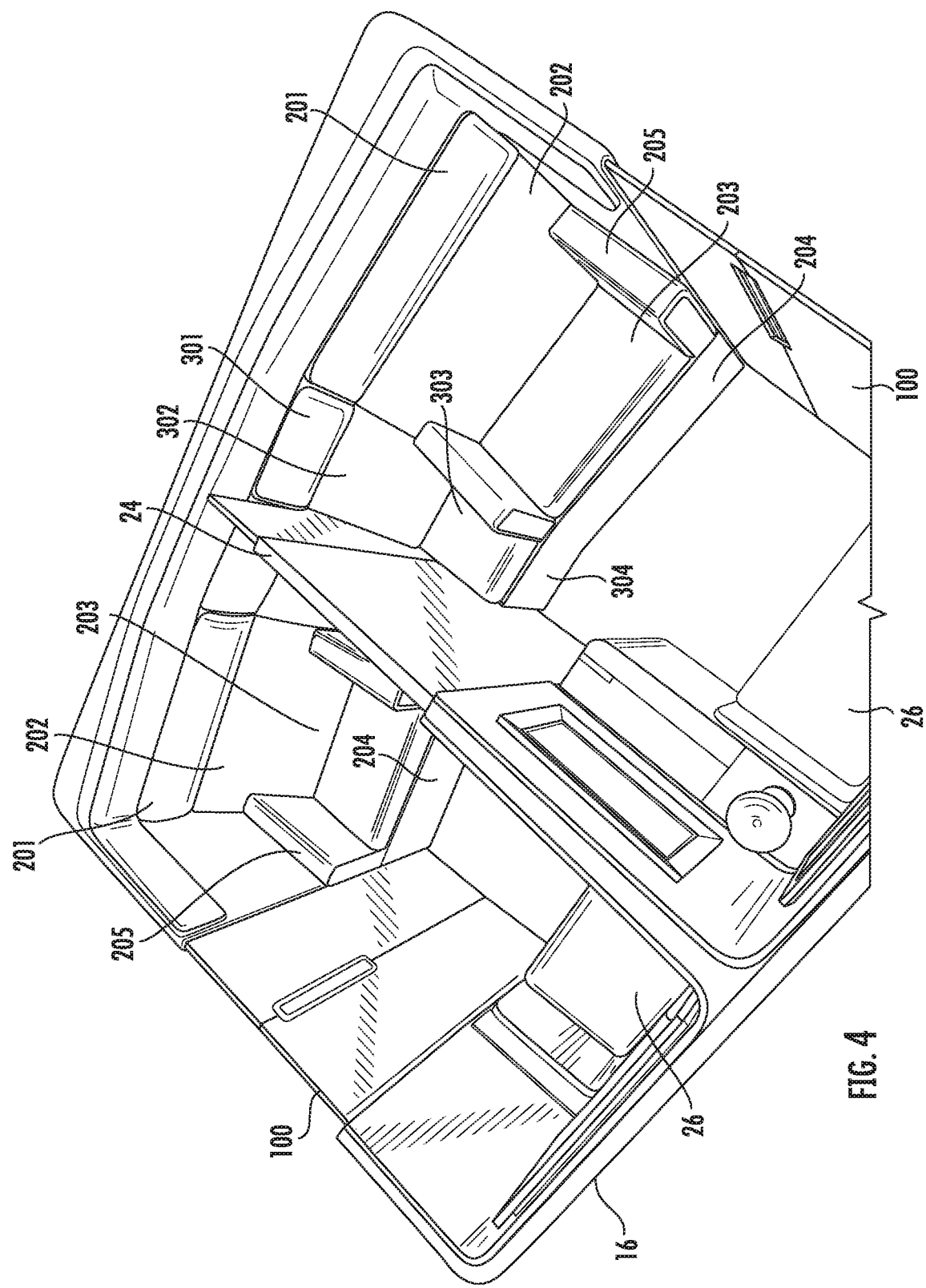
FIG. 4 is a top perspective view of the seating suite of FIG. 3, with the divider screen in a deployed position.
Figure 5:
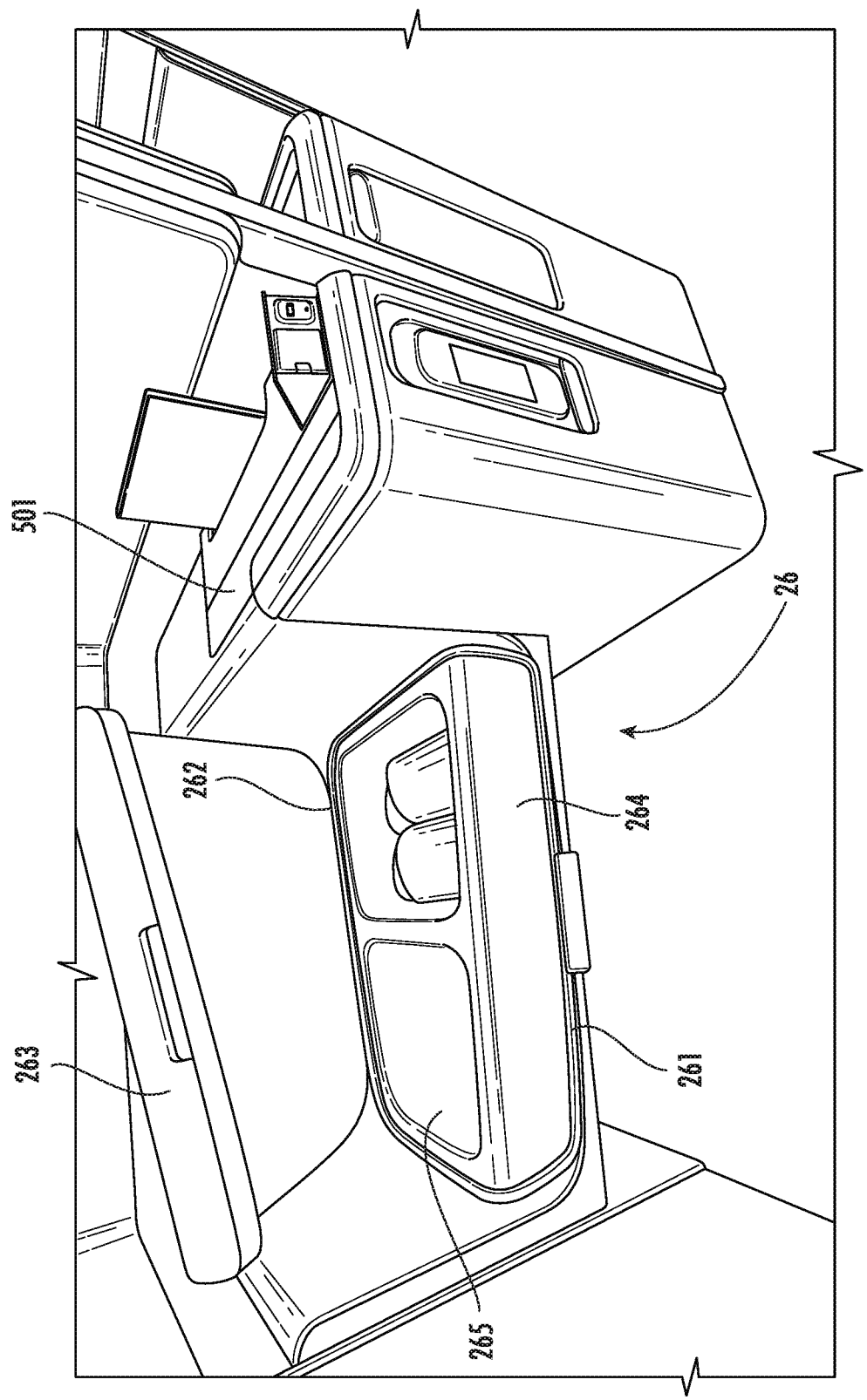
FIG. 5 is a top perspective view of the seating suite of FIG. 3, with one of the accommodation spaces arranged in a longitudinal bed position.

According to some embodiments, as best illustrated in FIGS. 3-5, the expansion wing 30 may be configured to be a side cushion having a headrest portion 301, a back portion 302, a bottom portion 303, and/or a footrest portion 304. In the seat upright position, best illustrated in FIGS. 3-4, the footrest portion 304 is positioned in an upright position adjacent to the floor space of the aircraft and may be pivotally attached at one end to the bottom portion 303.

In some embodiments, the bottom portion 303 is attached at one end to the footrest portion 304 and to the back portion 302 at the other end. In the seat upright position, the bottom portion 303 is arranged in a position that is substantially perpendicular with respect to footrest portion 304 and the back portion 302.

Finally, in certain embodiments, the headrest portion 301 is pivotally attached at one end to the back portion 302. In the seat upright position, the headrest portion 301 is positioned to be aligned in the same plane as the back portion 302.

Figure 8:
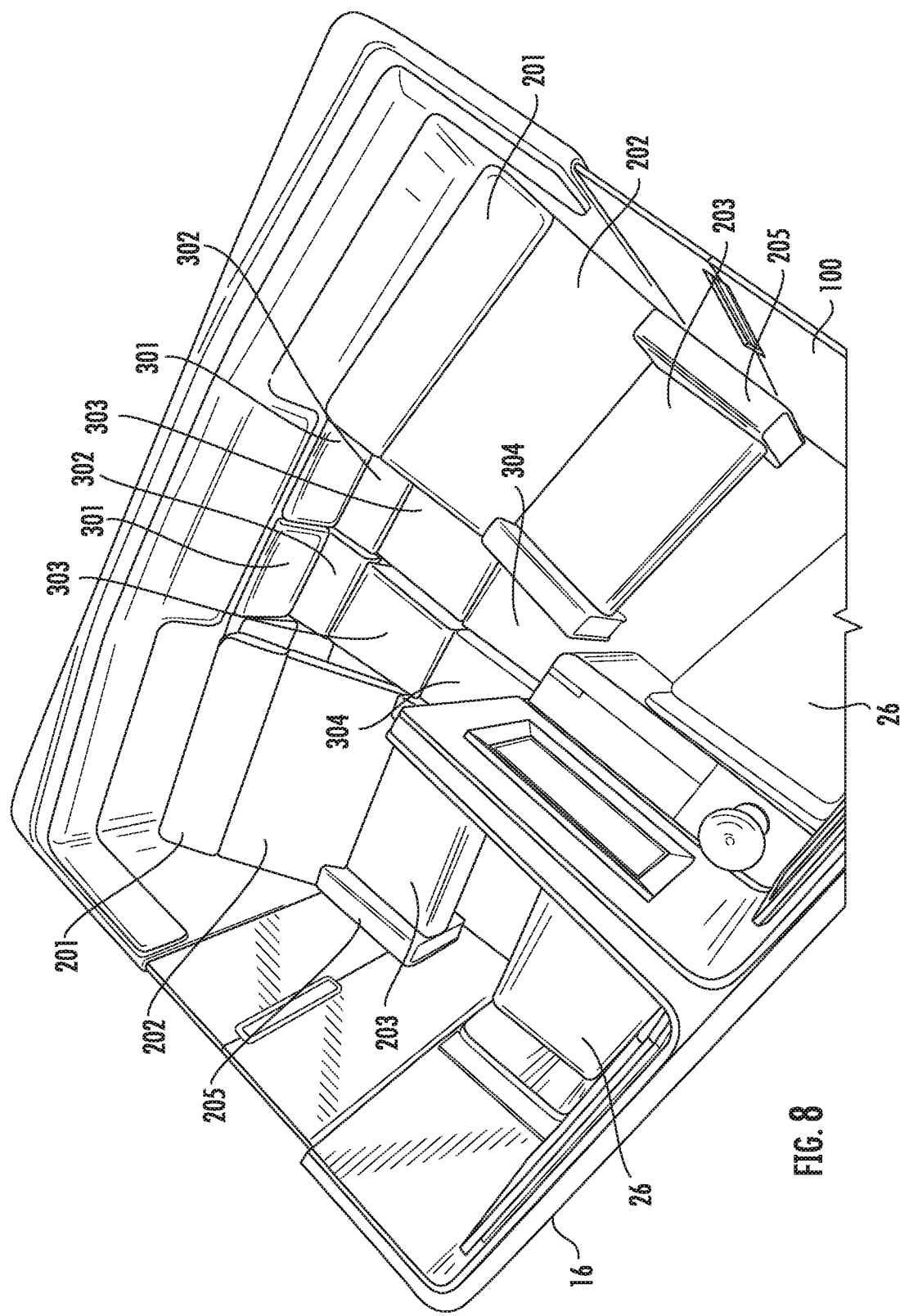
FIG. 8 is a top perspective view of the seating suite of FIG. 1 with the divider screen in a stowed position and both accommodation spaces arranged in an intermediate position, according to certain embodiments of the present invention.
Figure 9:
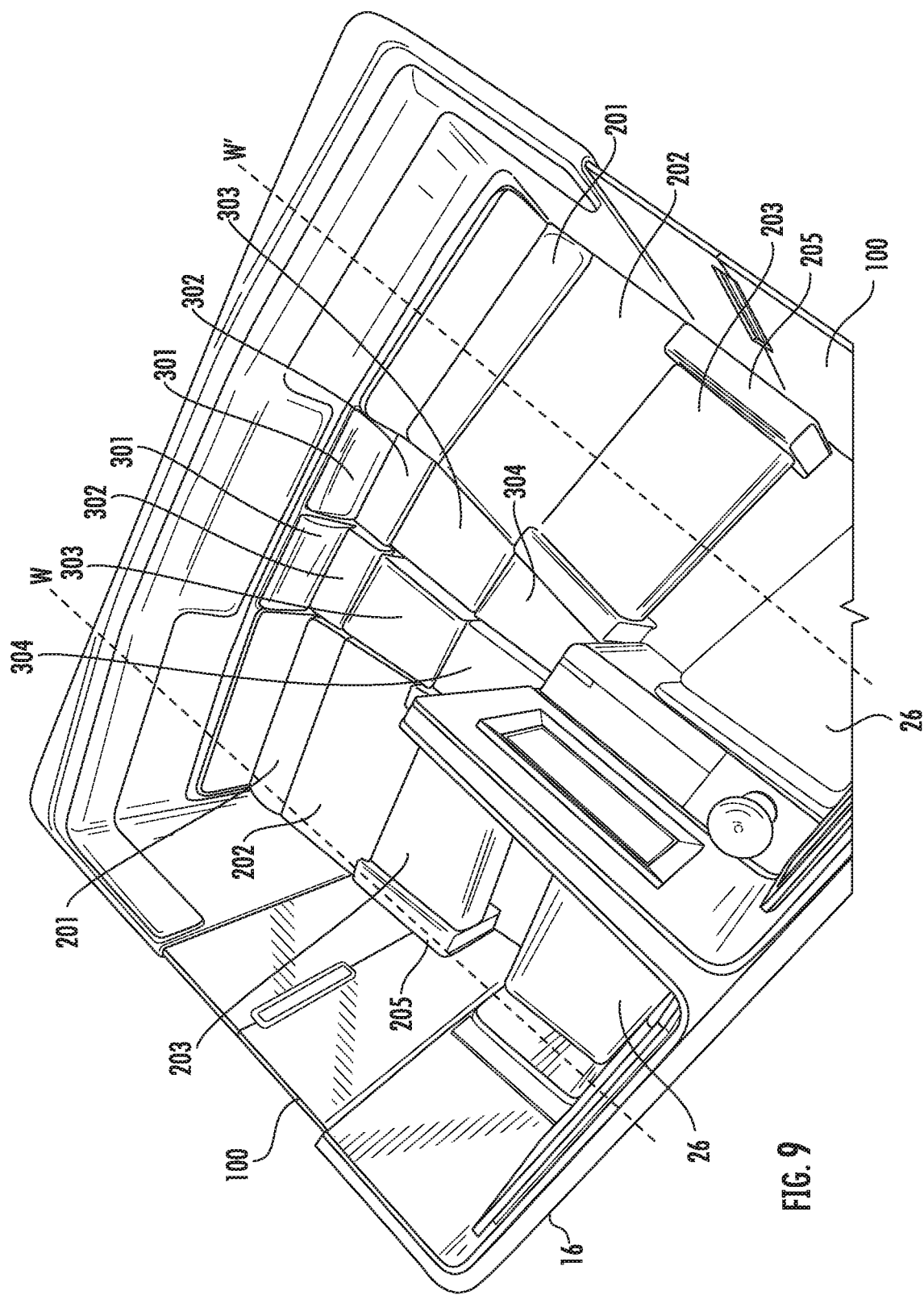
FIG. 9 is a top perspective view of the seating suite of FIG. 8, with both accommodation spaces arranged in a longitudinal bed position.

In certain embodiments, the expansion wing 30 may be configured to provide additional space to one or both primary accommodation spaces 14a. For example, as best illustrated in FIGS. 8-9, the expansion wing 30 may be configured as a side cushion that is reclinable with the seat 200 to form the longitudinal bed position, which is described in more detail below.

Figure 16:
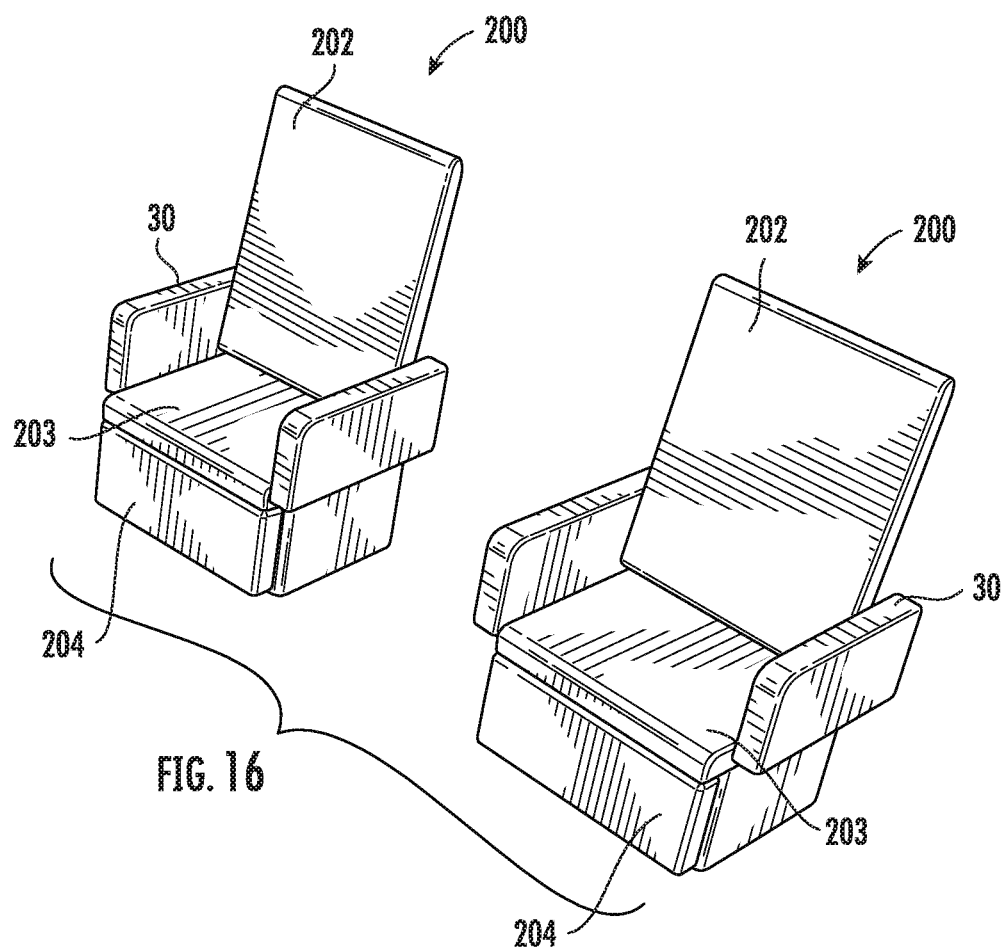
FIG. 16 is perspective view of the seats from the seating suite of FIG. 1 in an upright position, according to certain embodiments of the present invention.
Figure 17:
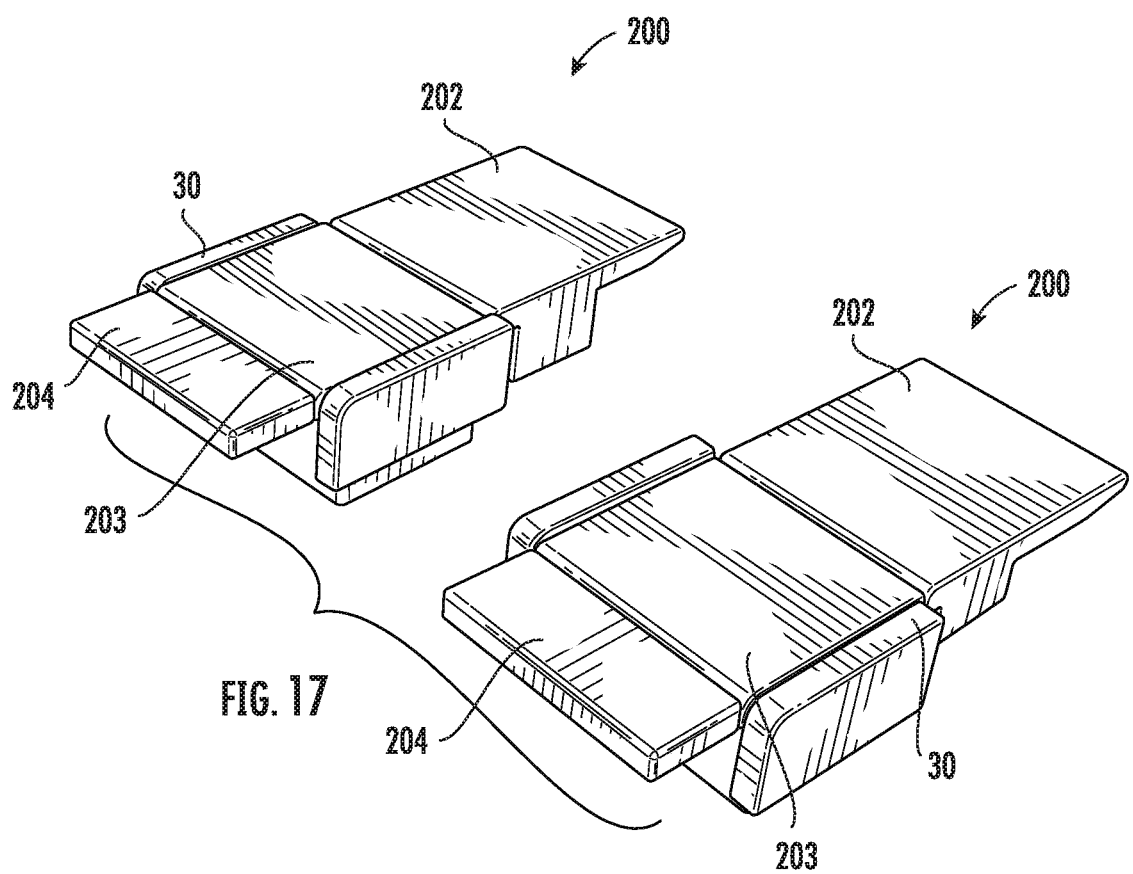
FIG. 17 is a perspective view of the seats of FIG. 16 in a longitudinal bed configuration without the extension wings deployed.
Figure 18:
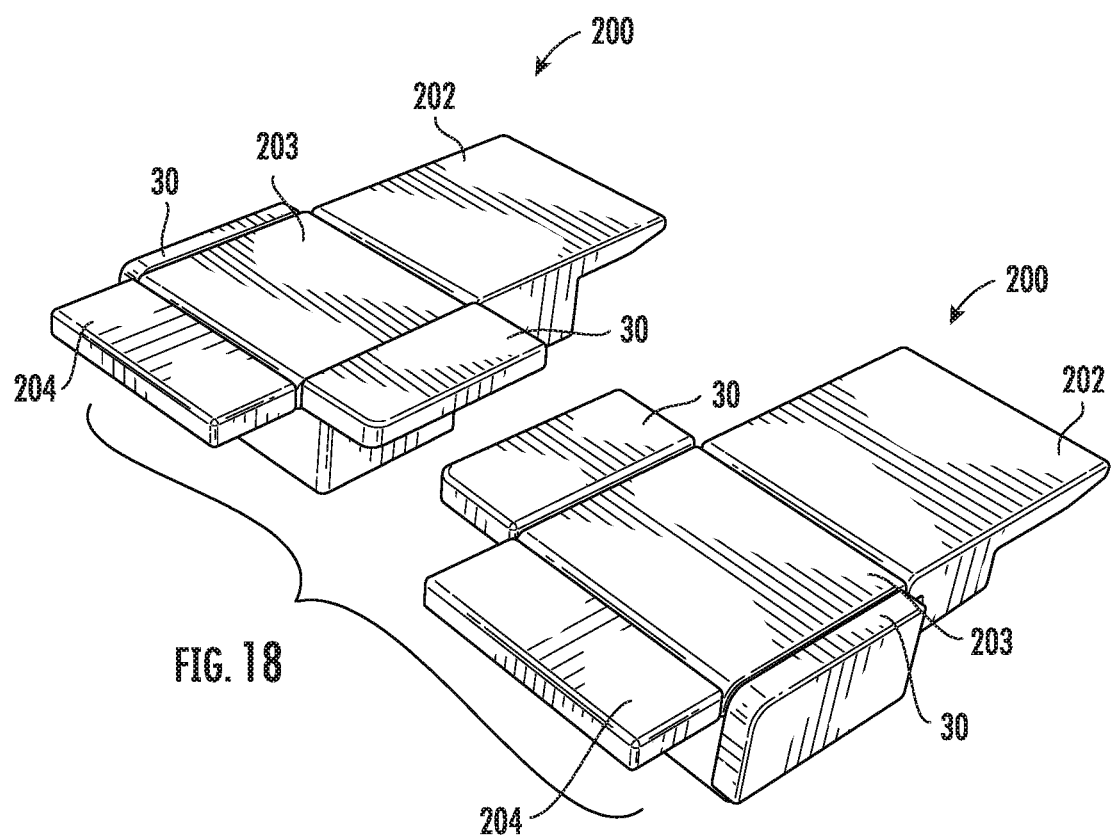
FIG. 18 is a perspective view of the seats of FIG. 16 in a longitudinal bed configuration with the extension wings deployed.

In other embodiments, as best illustrated in FIGS. 16-18, the expansion wing 30 may be configured as a convertible arm rest. The convertible arm rest 30 is capable of converting between an upright position, illustrated in FIG. 16, and a deployed position, illustrated in FIG. 18. In FIG. 16, the seat 200 is configured to be in the upright or TTL position wherein the seat back 202 is in a vertical upright position and the expansion wing 30 is raised above the seat bottom 203. The seat 200 can be deployed to a bed configuration, best illustrated in FIG. 17. In the bed configuration, the seat back 202 is reclined to a substantially horizontal position and the footrest 204 is deployed to a substantially horizontal position such that the seat back 202, seat bottom 203, and footrest 204 are configured to be arranged in approximately the same plane. The expansion wings 30 are rotated such that a top surface of the expansion wing 30 is flush with a top surface of the seat bottom 203. In the longitudinal bed position, the expansion wing 30 provides additional support/space for a passenger. According to this embodiment, either the left or right expansion wing 30 can be adjusted based on a passenger's preferences. The adjustment of the seat 200 between the various configurations can be either manual or electrically operated.

In certain embodiments, the seat 200 is configured to convert between the upright position, as best illustrated in FIGS. 3-4 and 16, and the longitudinal bed position, as best illustrated in FIGS. 5 and 17. In these embodiments, the seat 200 and the expansion wing 30 can both be deployed to form a bed that extends longitudinally along the accommodation space 14a, wherein the seat 200 is placed in mating contact with the ottoman 26. According to these embodiments, the expansion wing 30 may provide additional support/space for a passenger in the longitudinal bed position. As a result, the bed is arranged within the accommodation space 14a such that a passenger can lie in a longitudinal direction with respect to the aircraft cabin 10. In certain embodiments, the expansion wing 30 can remain in an upright position when the seat 200 is deployed to the longitudinal bed position.

Figure 10:
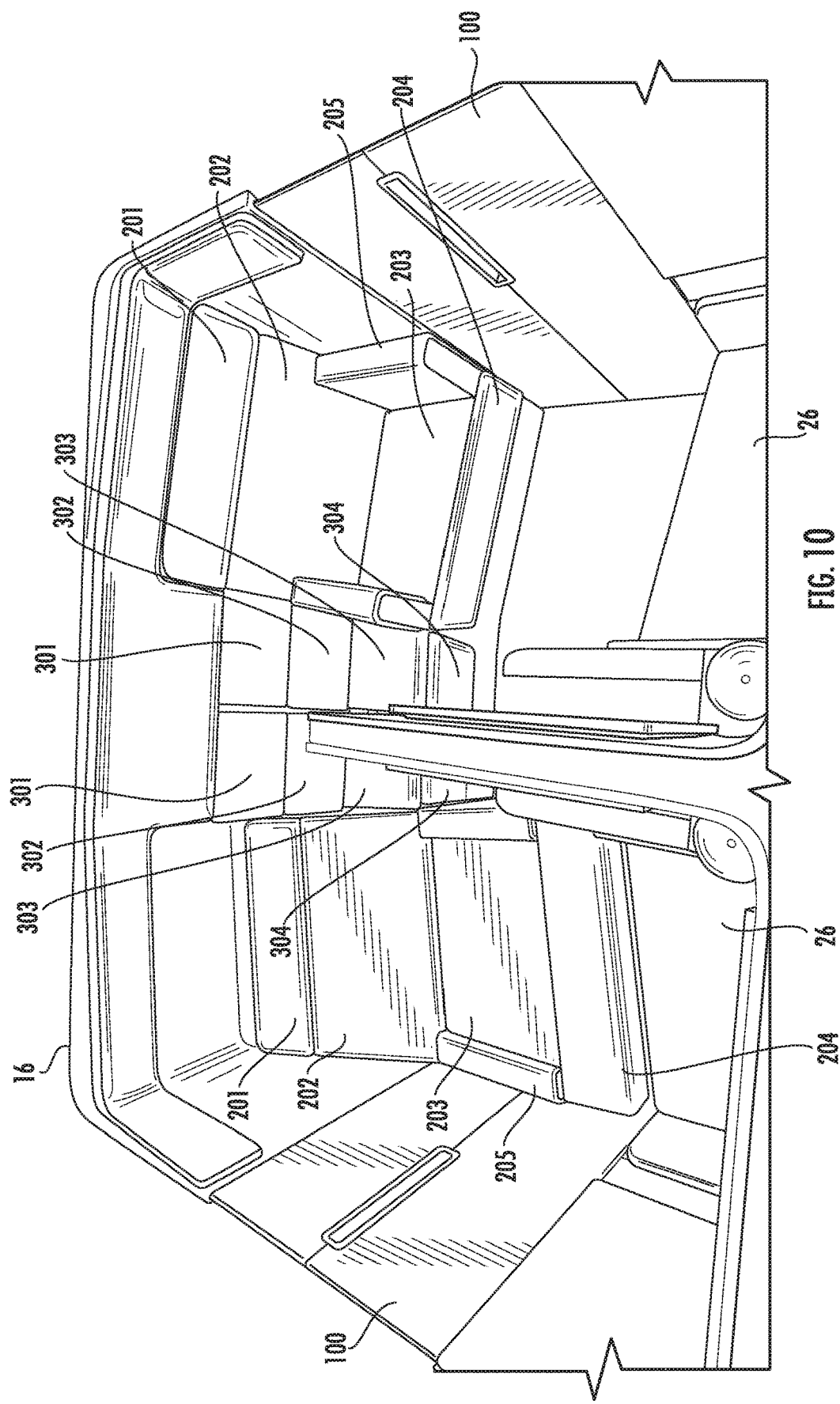
FIG. 10 is a top perspective view of the seating suite of FIG. 8, with one of the accommodation spaces arranged in an intermediate position.
Figure 11:
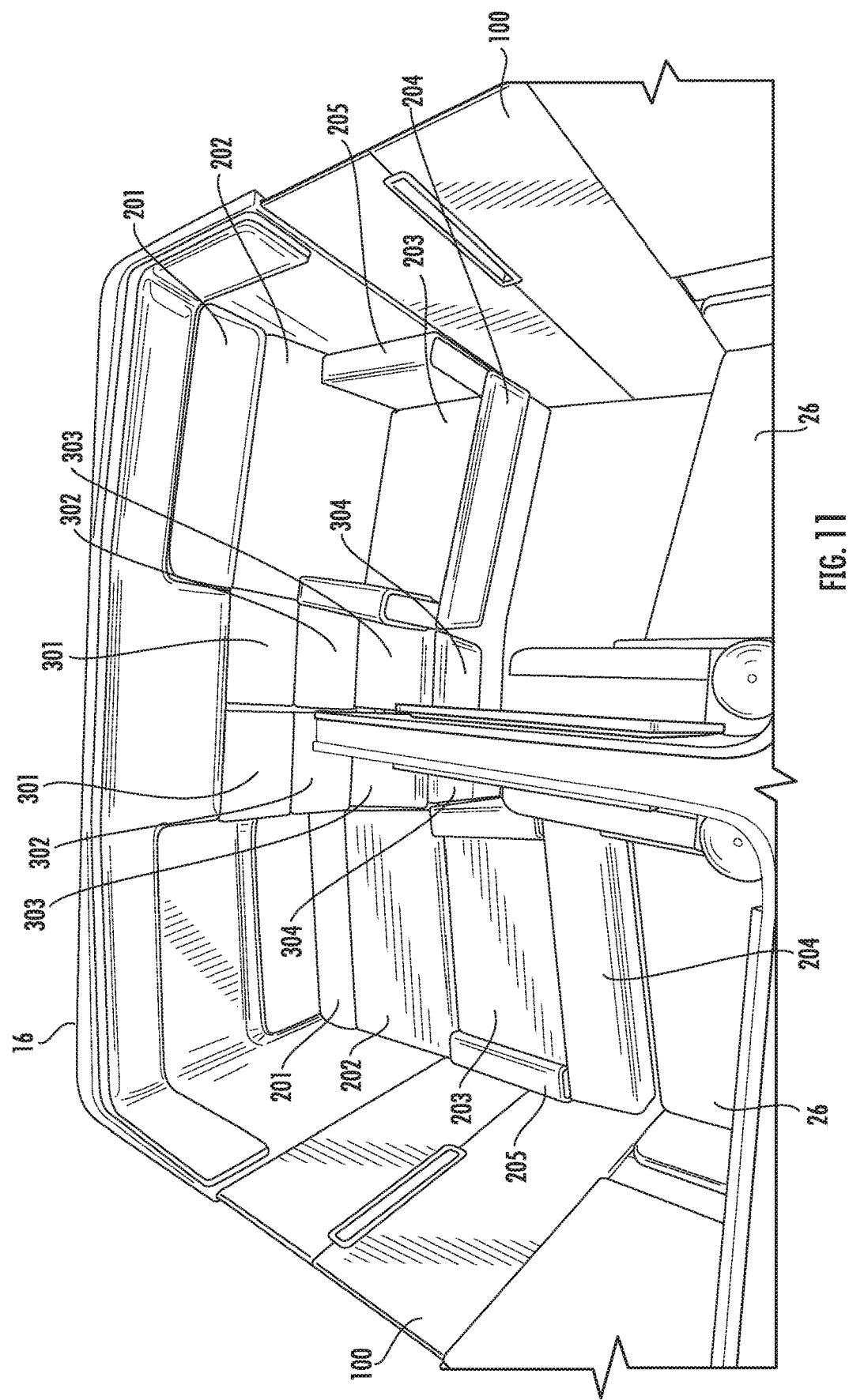
FIG. 11 is a top perspective view of the seating suite of FIG. 8, with one of the accommodation spaces arranged in a longitudinal bed position.

In the longitudinal bed configuration, as best illustrated in FIGS. 10-11, the seat 200 of the accommodation space 14a may be deployed to the longitudinal bed position independent of the seat 200 of an adjacent accommodation space 14a. In the longitudinal bed position, the seat 200 extends across the accommodation space 14a towards the ottoman 26 such that the seat back 202, seat bottom 203, and footrest 204 are arranged in the same plane so as to lie flat. The footrest 204 may be rotated from an upright position to substantially horizontal position where it is placed in mating contact with the ottoman 26. The headrest 201 is arranged adjacent to a sidewall of the accommodation space such that a back surface of the headrest 201 contacts the sidewall. According to this embodiment, the expansion wing 30 remains in the upright position.

Figure 1:
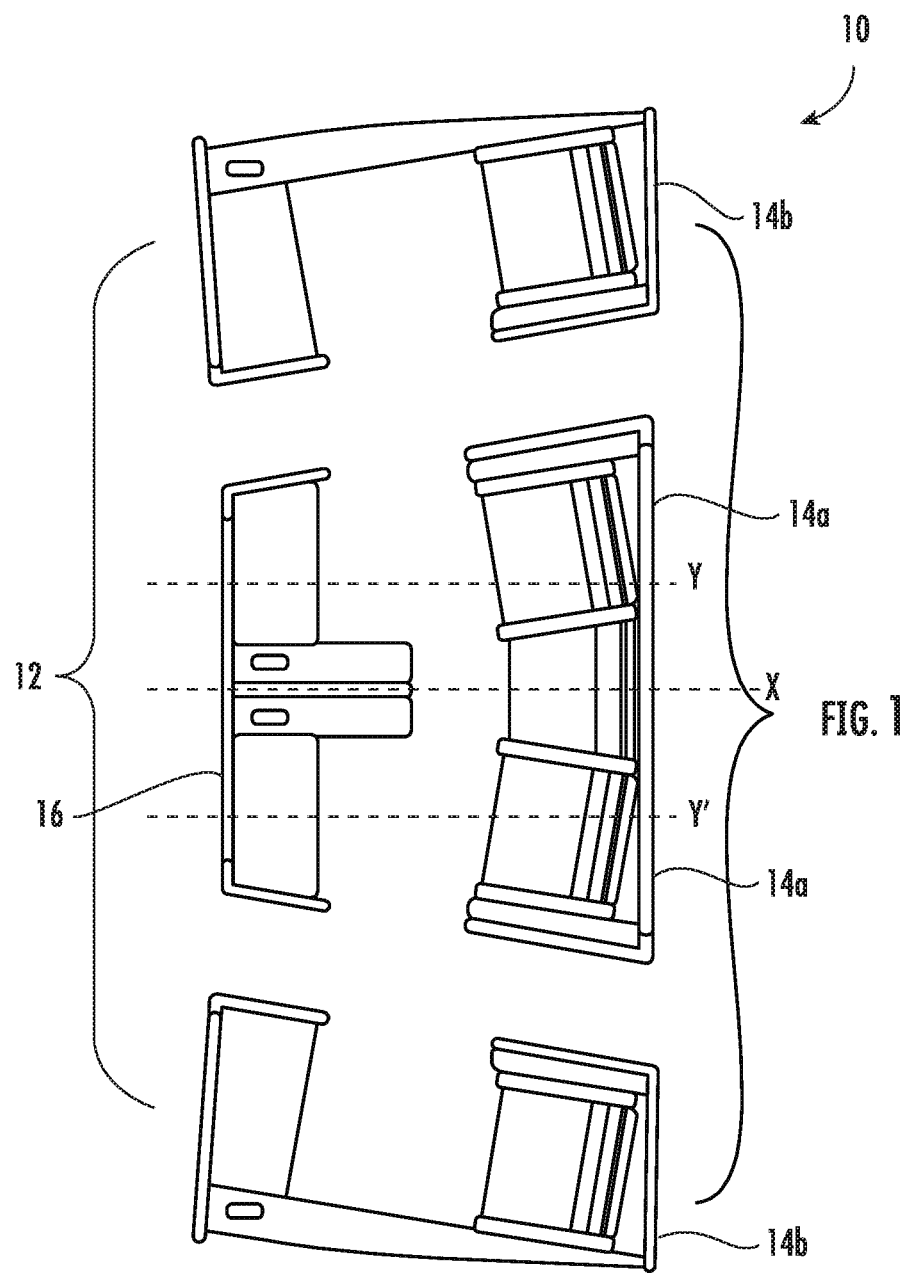
FIG. 1 is a top view of an aircraft cabin arrangement, according to certain embodiments of the present invention.

In certain embodiments, as best shown in FIGS. 3-4, two adjacent accommodation spaces 14a can be coupled together such the adjacent accommodation spaces 14a share a common floor space at a floor level of the aircraft cabin 10 to form one seating suite 16 capable of accommodating multiple passengers. In these embodiments, the adjacent first and second accommodation spaces 14a define a first space axis Y and a second space axis Y', as best illustrated in FIG. 1. In some embodiments, the first and second space axes Y, Y' are substantially parallel.

Figure 2:
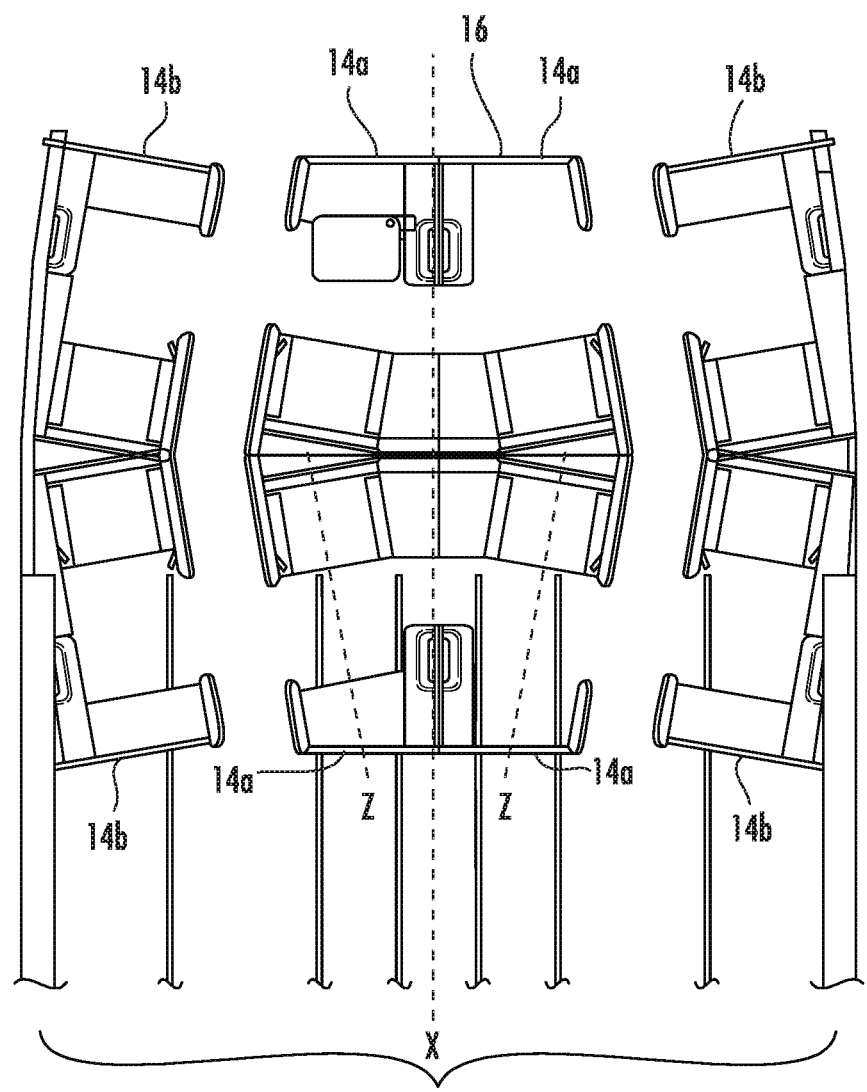
FIG. 2 is a top view of an aircraft cabin arrangement, according to certain embodiments of the present invention.

In further embodiments, the seats 200 within the adjacent accommodation spaces 14a define first seat axis Z and a second seat axis Z', as best illustrated in FIG. 2. In some embodiments, the first and second seat axes Z, Z' are substantially parallel. Furthermore, according to some embodiments, the seats 200 face substantially in the same direction.

The adjacent accommodation spaces 14a may be configured to be separated by a divider screen 24. In certain embodiments, as best illustrated in FIGS. 3-4, the divider screen 24 is configured to be moveable along the common floor space of the adjacent accommodation spaces 14a between a stowed position and a deployed position such that it regulates the privacy level between passengers during a flight. In certain embodiments, the sliding direction of the divider screen is substantially parallel to the first and second space axes.

As illustrated in FIG. 3, in the stowed position, the divider screen 24 is retracted such that it permits passenger egress of the seating suite 16 through the adjacent accommodation space 14a. As illustrated in FIG. 4, in the deployed position, the divider screen 24 is extends across the common floor space between adjacent accommodation spaces 14a, thereby preventing passenger egress of the seating suite 16 through the adjacent accommodation space 14a. In the deployed position, the divider screen 24 is located in a gap between the expansion wings 30 of each of adjacent accommodation spaces 14a. In certain embodiments, the divider screen is telescopically moved when the accommodation spaces 14a transition between the stowed and deployed positions. The divider screen 24 is moveable by sliding or other suitable means and can be manually or electrically operated.

In certain embodiments, the divider screen 24 extends from substantially the floor level of the aircraft to a height of at least approximately one meter above the floor level of the aircraft, but may extend higher or lower according to the desired level of access and privacy desired between the adjacent accommodation spaces 14a. For example, the divider screen 24 may extend from substantially floor level to a height of 1.25 m, 1.5 m, or 2 m or more above floor level.

When the seats 200 are positioned in the longitudinal bed positions (also referred to as the first and second bed surfaces), the first and second beds define a first bed axis W and a second bed axis W', as best illustrated in FIG. 9. In some embodiments, the first and second bed axes W, W' are substantially parallel. The first and second beds are further positioned at a bed height above the floor level.

Figure 6:
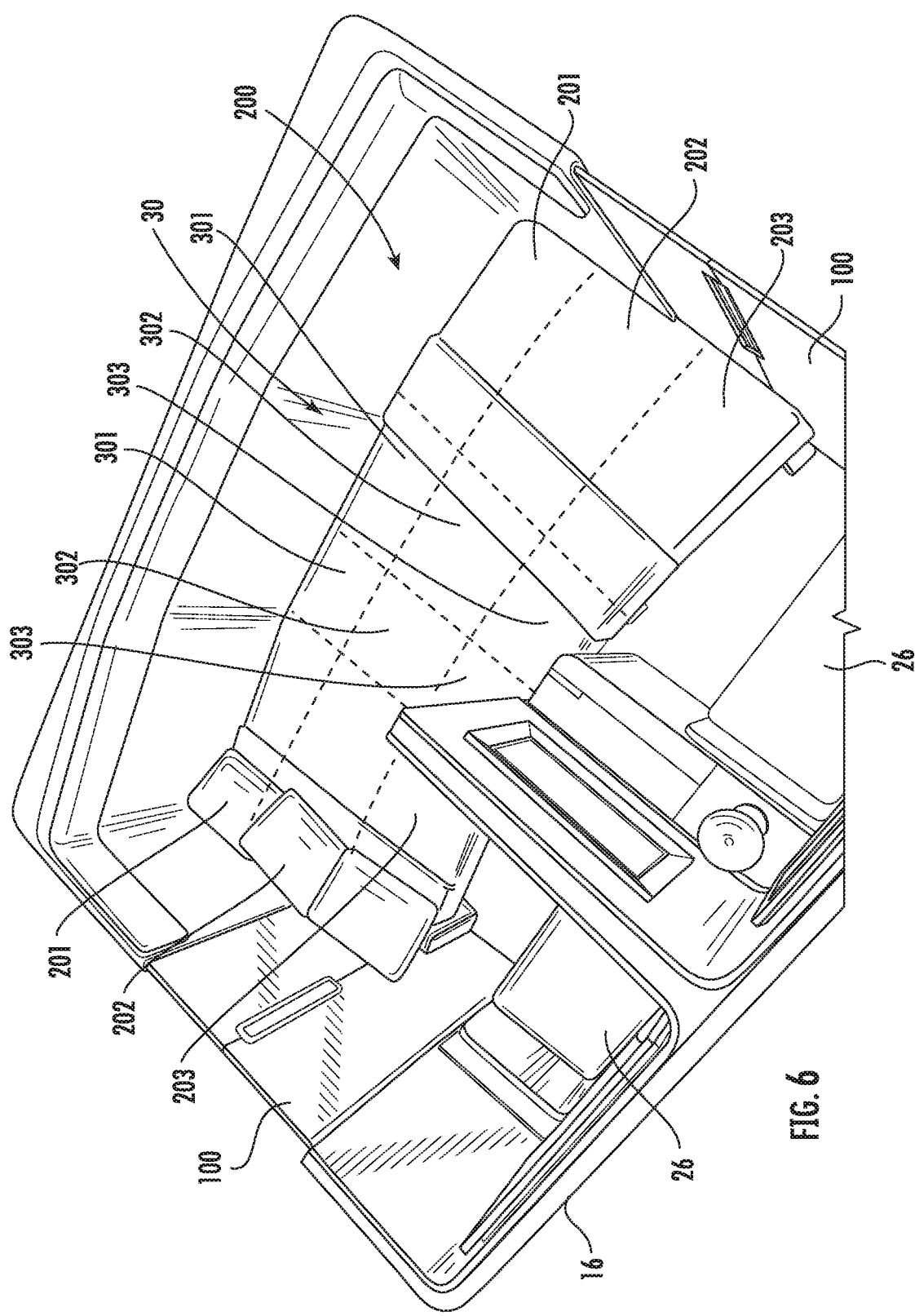
FIG. 6 is a top perspective view of the seating suite of FIG. 3, with both accommodation spaces arranged in a lateral bed position.
Figure 7:
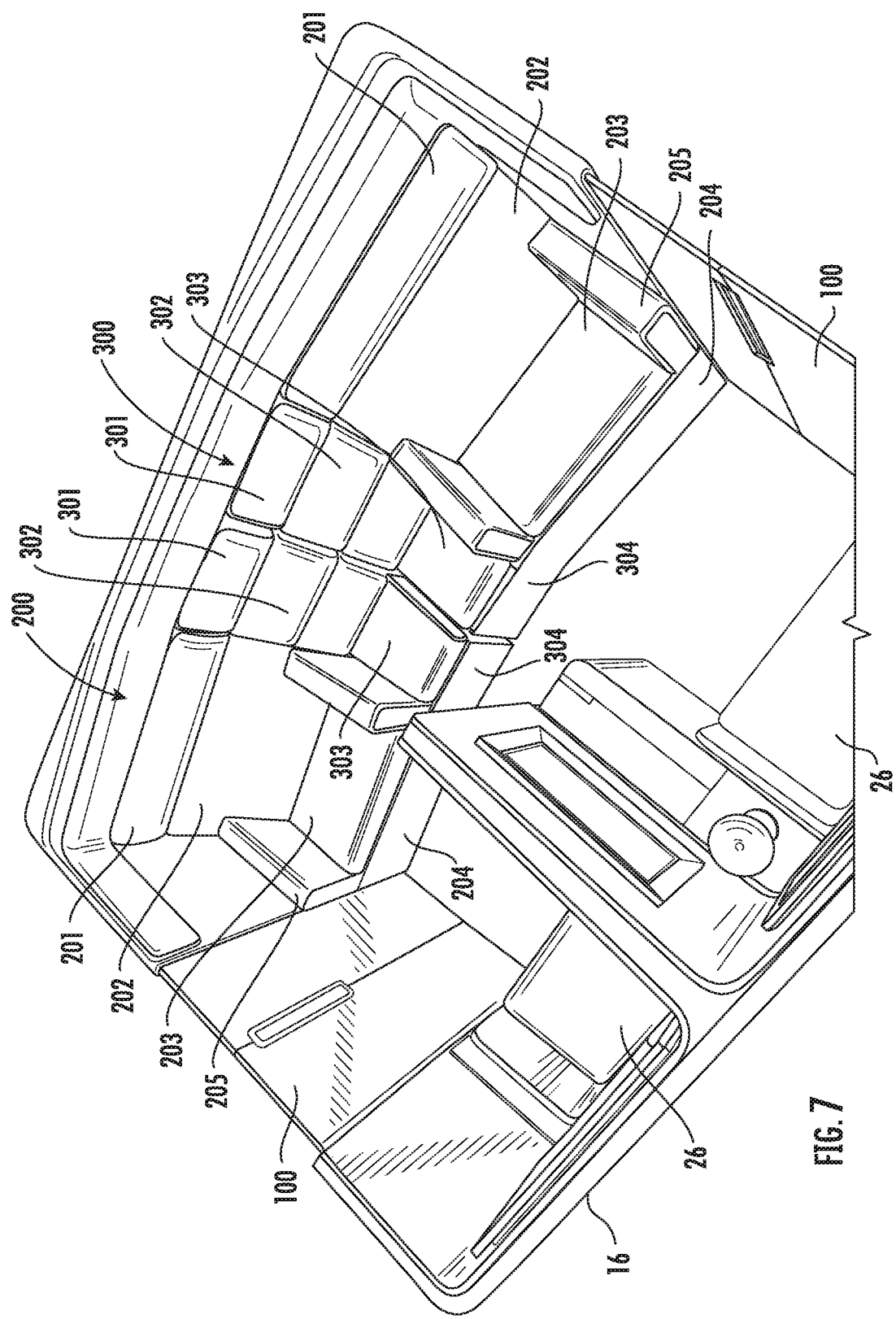
FIG. 7 is a top perspective view of the seating suite of FIG. 3, with both accommodation spaces arranged in an upright position.

In certain embodiments, as best illustrated in FIG. 6, when the divider screen is in the stowed position, the two accommodation spaces 14a may be configured to form a lateral bed position (also referred to as the third bed surface).

With the lateral bed position, the bed surface is formed at approximately a 90° angle to the longitudinal axis X of the aircraft. This configuration allows the passengers seating in the adjacent accommodation spaces 14a to share the bed position by lying across the first and second accommodation spaces 14a (or by lying fore/aft along each of the longitudinal bed positions). In this configuration, the seats 200 are configured to lie flat such that at least each seat back 202, seat bottom 203 and footrest 204 are aligned in the same plane. In certain embodiments, the headrest 201 may be positioned at an angle with respect to the seat back 202. Seat 200 extends across the accommodation space 14a towards the ottoman 26, but may not be placed in mating contact with the ottoman 26. In the lateral bed position, the expansion wings 30 also lie flat such that at least the footrest portion 304, bottom portion 303 and back portion 302 are arranged in the same plane as the seats 200. The expansion wing 30 extends across the accommodation space 14a to substantially fill most of the space between the adjacent seats 200.

In the lateral bed position, a gap may be located at bed height between the first and second bed surfaces and extending between the first and second beds in a direction substantially parallel to the bed axes. Furthermore, in some embodiments, there is no immovable structure in the gap between the first and second seats at bed height.

A filler may be provided in the gap between the seats 200 and/or the expansion wings 30. The filler may be an inflatable member so that, in an inflated state, the inflatable member provides a bed surface to co-operate with bed surfaces of the first and second beds when the first and second seats are converted to first and second beds. The inflatable member may comprise an air bladder that is inflatable/deflatable by electric pump operated via an adjacent switch or a remotely located switch or automatically in conjunction with the adjacent seat elements as they move to pre-determined positions. The filler or inflatable member is also provided at bed height between the first and second bed surfaces to define a shared bed surface comprising the first, second, and third bed surfaces. The filler may be configured to be between 1 and 8 inches and preferably between 3 and 6 inches such that it is sized to fill the gap between the seats 200 and/or the expansion wings 30. In certain embodiments, the filler is configured to be an insertable foam piece formed of any suitable material.

According to certain embodiments, the accommodation space 14a further comprises a tray table 50 configurable between a stowed position and a deployed position. In the stowed position, the tray table 50 is stored within a tray table console 501. In the deployed position, best illustrated in FIG. 12, the tray table 50 is positioned adjacent the seat 200 such that a passenger can use the tray table 50 while seated. The table is capable of moving between the stowed position and the deployed position by any suitable means including but not limited to a linkage system, telescoping, or any other suitable mechanism.

In certain embodiments, the accommodation space 14a further comprises a side table 60 positioned adjacent to the armrest 205 of the seat 200. When the armrest 205 is in the deployed position, the side table 60 can be deployed such that a surface of the side table 60 and an upper surface of the armrest 205 are positioned in the same plane.

In certain embodiments, the accommodation space 14a further comprises controls 42. As illustrated in FIG. 12, the controls 42 can be located adjacent the seat 200 such that they can be easily accessed by a passenger. In certain embodiments, the controls 42 can be comprised of a touch screen or a keypad or any other suitable interface. Furthermore, the controls 42 may be configured to electronically move the seat 200 between positions. In certain embodiments, the controls 42 are capable of controlling operation of other devices in the accommodation space 14a, for example a television, the divider screen 24, or any other suitable devices.

In certain embodiments, one or more secondary accommodation spaces 14b may be arranged on either or both sides of the primary accommodation spaces 14a. These accommodation spaces 14b may further be arranged at an angle with respect to the longitudinal axis X. As illustrated in FIG. 2, the primary and secondary accommodation spaces 14a, 14b may be arranged in a back to back arrangement such that a passenger seating in the accommodation spaces 14a, 14b may be forward-facing or aft-facing with respect to a direction of the aircraft cabin.

In some embodiments, the accommodation space 14b is configured to have the same features as the accommodation space 14a, including but not limited to the seat 200, expansion wing 30, door 100, tray table 50, and ottoman 26. As with accommodation space 14a, the seat 200 is configured to have an upright or TTL position and a longitudinal bed position and is capable of transitioning between these positions in the same or different manner as the accommodation space 14a.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The invention claimed is:

1. A seating arrangement for an aircraft, comprising:
   a first seat configured to be positioned in a first accommodation space of the aircraft and is convertible to a first bed having a first bed surface;
   a second seat configured to be positioned in a second accommodation space of the aircraft and is convertible to a second bed having a second bed surface, wherein the first accommodation space and the second accommodation space are configured to share a common floor space at a floor level of the aircraft; and
   wherein the arrangement further comprises a filler provided in a gap between the first seat and the second seat so that the filler provides a third bed surface to co-operate with the first bed surface and the second bed surface; and
   a divider screen
      located between the first accommodation space and the second accommodation space, moveable, by sliding in a direction along the common floor space, between
         a stowed position permitting passenger egress between the first accommodation space and the second accommodation space across the common floor space, and
         a deployed position preventing passenger egress between the first accommodation space and the second accommodation space across the common floor space, and
      extending from substantially the floor level of the aircraft to a height of at least one meter above the floor level of the aircraft.

2. The seating arrangement of claim 1, wherein, in the stowed position, the divider screen is located in the gap between the first seat and the second seat.

3. The seating arrangement of claim 1, wherein the divider screen extends from substantially the floor level to a height of at least 1.25 meters above the floor level.

4. The seating arrangement of claim 1, wherein the first seat and the second seat define a first seat axis and a second seat axis, respectively, and wherein the first seat axis and the second seat axis are substantially parallel.

5. The seating arrangement of claim 1, wherein the first bed and the second bed have a first bed axis and a second bed axis, respectively, that are substantially parallel, and the gap is at a bed height between the first bed surface and the second bed surface and extends between the first bed and the second bed in a direction substantially parallel to the first bed axis and the second bed axis.

6. The seating arrangement of claim 1, wherein the filler comprises an inflatable member, wherein the inflatable member, in an inflated state, provides the third bed surface to co-operate with the first bed surface and the second bed surface.

7. The seating arrangement of claim 1, wherein the first seat and the second seat face substantially the same direction.

8. The seating arrangement of claim 1, wherein the sliding movement of the divider screen comprises a telescopic action.

9. The seating arrangement of claim 1, wherein the sliding movement of the divider screen can be manually or electrically operated.

10. The seating arrangement of claim 1, wherein the first accommodation space and the second accommodation space are defined by aircraft module walls and the divider screen.

11. The seating arrangement of claim 1, wherein there is no immovable structure in the gap between the first seat and the second seat at a bed height.

12. The seating arrangement of claim 1, wherein the first accommodation space and the second accommodation space define a first space axis and a second space axis, respectively, and wherein the first space axis and the second space axis are substantially parallel.

13. The seating arrangement of claim 12, wherein the sliding direction of the divider screen is substantially parallel to the first space axis and the second space axis.

14. The seating arrangement of claim 1,
   wherein the first bed and the second bed have a first bed axis and a second bed axis, respectively, that are substantially parallel;
   wherein the first bed surface and the second bed surface are at a bed height above the floor level; and
   wherein the third bed surface provided by the filler is also provided at bed height between the first bed surface and the second bed surface to define a shared bed surface comprising the first bed surface, the second bed surface, and the third bed surface.

15. The seating arrangement of claim 14, wherein the filler comprises an inflatable member, wherein the inflatable member, in an inflated state, provides the third bed surface to co-operate with the first bed surface and the second bed surface.

16. The seating arrangement of claim 14, wherein there is no immovable structure in the gap between the first seat and the second seat at the bed height.

17. The seating arrangement of claim 14, wherein the first seat and the second seat define a first seat axis and a second seat axis, respectively, and wherein the first seat axis and the second seat axis are substantially parallel.

18. The seating arrangement of claim 14, wherein the first seat and the second seat face substantially the same direction.

19. The seating arrangement of claim 14, wherein, in the stowed position, the divider screen is located in the gap between the first seat and the second seat.

20. The seating arrangement of claim 14, wherein the divider screen extends from substantially the floor level to a height of at least 1.25 meters above the floor level.

21. The seating arrangement of claim 14, wherein the sliding movement of the divider screen comprises a telescopic action.

22. The seating arrangement of claim 14, wherein the sliding movement of the divider screen can be manually or electrically operated.

23. The seating arrangement of claim 14, wherein the first accommodation space and the second accommodation space define a first space axis and a second space axis, respectively, and wherein the first space axis and the second space axis are substantially parallel and wherein the sliding direction of the divider screen is substantially parallel to the first space axis and the second space axis.

24. The seating arrangement of claim 14, wherein the first accommodation space and the second accommodation space are defined by aircraft module walls and the divider screen.

25. The seating arrangement of claim 14, wherein the gap is at bed height between the first bed surface and the second bed surface and extends between the first bed and the second bed in a direction substantially parallel to the first bed axis and the second bed axis.

26. The seating arrangement of claim 25, wherein the filler comprises an inflatable member, wherein the inflatable member, in an inflated state, provides the third bed surface to co-operate with the first bed surface and the second bed surface.

* * * * *